United States Patent
Seamans et al.

(10) Patent No.: US 10,850,229 B2
(45) Date of Patent: Dec. 1, 2020

(54) METHOD OF PROCESSING SULFUR-BEARING WASTES FROM REFINERIES AND UPGRADERS

(71) Applicant: Porocel International, LLC, Houston, TX (US)

(72) Inventors: James Seamans, The Woodlands, TX (US); Terence McHugh, Post Falls, ID (US); Brian Visioli, Houston, TX (US)

(73) Assignee: Porocel International, LLC, Houston, TX (US)

( * ) Notice: Subject to any disclaimer, the term of this patent is extended or adjusted under 35 U.S.C. 154(b) by 0 days.

(21) Appl. No.: 16/595,051

(22) Filed: Oct. 7, 2019

(65) Prior Publication Data
US 2020/0108345 A1    Apr. 9, 2020

Related U.S. Application Data
(60) Provisional application No. 62/742,524, filed on Oct. 8, 2018.

(51) Int. Cl.
*B01D 53/50* (2006.01)
*B01D 53/14* (2006.01)

(52) U.S. Cl.
CPC ......... *B01D 53/50* (2013.01); *B01D 53/1481* (2013.01); *B01D 2257/302* (2013.01); *B01D 2258/0283* (2013.01)

(58) Field of Classification Search
CPC . C01B 17/04; C01B 17/0404; C01B 17/0447; C01B 17/0456; C01B 17/74;
(Continued)

(56) References Cited

U.S. PATENT DOCUMENTS 2,919,976 A * 1/1960 Feagan, Jr. ......... C01B 17/0426
                                                         423/574.1
3,681,024 A * 8/1972 Hujsak et al. ...... C01B 17/0447
                                                         423/575
(Continued)

FOREIGN PATENT DOCUMENTS

EP      0 252 497 A2 * 1/1988 ......... C01B 17/0404
EP      1230149 B1    12/2005
WO      2016/102652 A1  6/2016

OTHER PUBLICATIONS

International Search Report and Written Opinion regarding corresponding PCT Application No. PCT/US2019/055026, dated Jan. 8, 2020.
(Continued)

*Primary Examiner* — Timothy C Vanoy
(74) *Attorney, Agent, or Firm* — Lewis & Reese, PLLC

(57) ABSTRACT

The methods and systems are disclosed which leverage sulfur abatement resources present at most refineries or other hydrocarbon processing plants, such as natural gas processing plants to capture and treat sulfur-containing byproducts, such as $SO_2$, generated during the regeneration of spent HDP catalysts. Thus, the disclosed methods and systems allow for converting hazardous waste spent catalyst to a salable product at it source while simultaneously capturing the sulfur oxides removed from the catalyst and converting them to a useful product instead of a resultant waste stream requiring management and/or disposal. Thus, spent sulfur bearing refinery wastes, such as HDP catalyst, can be roasted or regenerated at the refinery site to convert the hazardous sulfur-bearing wastes into one or more salable products.

20 Claims, 4 Drawing Sheets

(58) Field of Classification Search
CPC .... B01D 53/50; B01D 53/52; B01D 53/8615; B01D 2257/302; B01D 2257/304; B01J 38/00; B01J 38/02; B01J 38/04; C10L 3/103

See application file for complete search history.

(56) References Cited

U.S. PATENT DOCUMENTS

| | | | |
|---|---|---|---|
| 4,233,276 A | | 11/1980 | D'Souza et al. |
| 4,632,819 A | * | 12/1986 | Fischer ............... C01B 17/0413 423/574.1 |
| 4,769,229 A | * | 9/1988 | McGalliard .......... B01D 53/523 423/230 |
| 5,439,664 A | * | 8/1995 | Heisel .................... C01B 17/04 423/222 |
| 5,965,100 A | * | 10/1999 | Khanmamedov ... C01B 17/0434 423/574.1 |
| 7,214,358 B2 | | 5/2007 | Ravary et al. |

OTHER PUBLICATIONS

Iwamoto, Ryuichiro, "Regeneration of Residue Hydrodesulfurization Catalyst," Journal of the Japan Petroleum Institute, 56, 3, 2013, pp. 109-121.

Laursen, Jens Kristen, "The Process Principles," Topsoe A/S, Hydrocarbon Engineering, Aug. 2007, 4 pages.

Marafi, M. et al., "Utilization of Waste Spent Hydroprocessing Catalyst: Development of a Process for Full Recovery of Deposited Metals and Alumina Support," WIT Transactions on Ecology and The Environment, vol. 163, 2013, pp. 237-249.

"Refining 101," Powerpoint presentation by Valero, Jul. 6, 2010, 26 pages.

"Regenerated Catalyst Performance," CRI International, Inc., Hydrocarbon Engineering, Dec. 1999, pp. 39-42.

"Sulfur Recovery," Inorganic Chemical Industry, Emission Factors, Section 8.13, Jul. 1993, reformatted Jan. 1995, 5 pages.

* cited by examiner

METHOD OF PROCESSING SULFUR-BEARING WASTES FROM REFINERIES AND UPGRADERS

CROSS REFERENCE TO RELATED APPLICATIONS

This is a non-provisional of U.S. Provisional Patent Application Ser. No. 62/742,524, filed Oct. 8, 2018, which is incorporated herein by reference in its entirety, and to which priority is claimed.

FIELD OF THE TECHNOLOGY

The present application relates to techniques for recovering and treating spent catalysts and other sulfur-bearing traps, guards, and wastes from a hydrocarbon refining process.

BACKGROUND

Catalytic hydroprocessing (HDP) is applied extensively in the petroleum refining and oil sands upgrading industries to remove impurities, such as heteroatoms (sulfur, nitrogen, oxygen), hydrogenate or hydrocrack heavy hydrocarbons, such as PNAs (polynuclear aromatics), and to remove metal/metalloid contaminants such as (Si, As, Fe, Na, V and Ni). One of the more commonly used catalysts for hydroprocessing comprises one or more Group VIII (Groups 8-10, IUPAC) metals, such as cobalt (Co) or nickel (Ni) and one or more Group VIB (Group 6, IUPAC) metals, such as molybdenum (Mo) or tungsten (W) supported on a carrier material, such as alumina ($Al_2O_3$), silica alumina, zeolite, or combinations thereof. When a hydrotreating catalyst is used in a hydrotreating process, the activity of the catalyst decreases over time, due to the accumulation of carbon-containing deposits, referred to as coke, on the catalyst and/or by the presence of deactivating inorganic materials, such as vanadium (V). Some of these catalysts may be regenerated or rejuvenated for reuse, but more often the spent catalysts are not recovered and, instead, are treated as waste. The spent catalysts are often classified as hazardous waste and must be handled accordingly, whether they are sent to a landfill or for regeneration or metals reclamation. Thus, there is a need for more efficient processes for catalyst recovery and catalyst metal reclamation.

The regeneration or metal reclamation process is typically remote from the refinery or upgrader. The first step in regeneration or reclamation is generally roasting the spent catalyst in the presence of oxygen at elevated temperature. This results in the conversion of the sulfur compounds on the catalyst to volatile sulfur oxide compounds that are considered health and environmental hazards. Common methods of abatement of these sulfur oxide compounds include caustic scrubbing and lime scrubbing. These methods, while effective in preventing the sulfur oxides from entering the atmosphere, create secondary liquid and/or solid waste streams such as sodium sulfate/spent caustic solution or contaminated calcium sulfate solids.

SUMMARY

Disclosed herein are methods of treating a sulfur-bearing waste. According to some embodiments, the method comprises: heating the sulfur-bearing waste to produce a first gas stream, wherein the first gas stream comprises sulfur dioxide ($SO_2$), providing at least a portion of the first gas stream to a sulfur treatment process (STP), providing a second gas stream to the STP, wherein the second gas stream comprises hydrogen sulfide ($H_2S$), providing a third gas stream to the STP, wherein the third gas stream comprises oxygen ($O_2$), and adjusting an amount of the third gas stream provided to the STP to maintain a reaction between $SO_2$ and $H_2S$. According to some embodiments, the STP is an STP of a hydrocarbon processing plant. According to some embodiments, the hydrocarbon processing plant is a hydrocarbon refining plant, a hydrocarbon upgrader, or a natural gas treatment plant. According to some embodiments, the second gas stream comprises one or more gas streams derived from a hydrocarbon processing operation of the hydrocarbon processing plant. According to some embodiments, the second gas stream is selected from the group consisting of an acid gas stream, an amine gas stream, and a sour water stripping off-gas stream. According to some embodiments, the STP comprises a thermal reactor and providing the first, second, and third gas streams to the STP comprises providing the first, second, and third gas streams to the thermal reactor. According to some embodiments, the hydrocarbon processing plant is a hydrocarbon refining plant. According to some embodiments, the sulfur-bearing waste comprises spent hydroprocessing (HDP) catalyst. According to some embodiments, the spent HDP catalyst is derived from the hydrocarbon refining plant. According to some embodiments, the method comprises heating the spent HDP catalyst comprises heating the spent HDP catalyst at a temperature of about 500° F. to about 850° F. According to some embodiments, heating the spent HDP catalyst comprises first heating the spent HDP catalyst at a first temperature of about 500° F. to about 700° F. to strip the contaminants from the catalyst and then heating the spent HDP catalyst at a second temperature of about 750° F. to about 850° F. in an oxygen-containing atmosphere to remove coke on the spent HDP catalyst and to convert metal sulfides of the spent HDP catalyst to their oxides. According to some embodiments, heating the spent HDP catalyst comprises heating the spent HDP catalyst at a temperature of about 800° F. to about 2000° F. According to some embodiments, the second gas stream comprises one or more streams selected from the groups consisting of an acid gas stream of a hydrocarbon refining process, an amine gas stream of a hydrocarbon refining process, and a sour water stripping off-gas stream of a hydrocarbon refining process. According to some embodiments, the sulfur-bearing waste comprises tank sludge. According to some embodiments, the sulfur-bearing waste comprises sulfur trap catalyst. According to some embodiments, the method further comprises separating the sulfur-bearing waste from a mixture of oil and the sulfur-bearing waste before heating the sulfur-bearing waste. According to some embodiments, the first gas stream further comprises one or more components selected from the group consisting of carbon dioxide ($CO_2$), water ($H_2O$), and nitrogen ($N_2$) and wherein providing a portion of the first gas stream to the STP comprises treating the first gas stream to provide an $SO_2$-enriched gas stream and providing the $SO_2$-enriched gas stream to the STP. According to some embodiments, treating the first gas stream to provide an $SO_2$-enriched gas stream comprises: contacting the first gas stream with a lean $SO_2$-adsorbing medium to yield an $SO_2$-enriched $SO_2$-adsorbing medium and an $SO_2$-depleted gas, and stripping gaseous $SO_2$ from the $SO_2$-enriched $SO_2$-adsorbing medium to yield the $SO_2$-enriched gas stream. According to some embodiments, the lean $SO_2$-adsorbing medium comprises a solvent comprising an amine. According to some embodiments, adjusting the amount of the third gas stream provided to the STP comprises: determining a feed rate of the at least a portion of the first gas stream to the STP, determining a feed rate of the second gas stream to the STP, and adjusting an amount of the third gas stream provided to the STP based on the determined feed rates. According to some embodiments, adjusting an amount of the third gas stream provided to the STP based on the determined feed rates comprises decreasing the amount of the third gas stream to the STP if the feed rate of the at least a portion of the first gas stream to the STP increases relative to the feed rate of the second gas stream to the STP. According to some embodiments, adjusting the amount of the third gas stream provided to the STP comprises: determining a composition of a tail gas of the STP, and adjusting the amount of the third gas stream provided to the STP based on the determined composition. According to some embodiments, determining the composition of a tail gas of the STP comprises determining a ratio of $H_2S$ to $SO_2$ in the tail gas. According to some embodiments, adjusting the amount of the third gas stream provided to the STP based on the determined composition comprises increasing the amount of the third gas stream provided to the STP if the ratio of $H_2S$ to $SO_2$ increases. According to some embodiments, providing at least a portion of the first gas stream to the STP comprises treating the first gas stream to remove particulates from the first gas stream. According to some embodiments, the STP comprises a Claus process. According to some embodiments, the STP comprises a sulfuric acid plant.

Also disclosed herein is a retrofitted refinery comprising, at least one catalyst recovery unit and at least one sulfur treating process (STP), wherein: the at least one catalyst recovery unit is configured to heat a sulfur-bearing waste to produce a first gas stream, wherein the first gas stream comprises sulfur dioxide ($SO_2$); and wherein the SRU unit is configured to: receive the first gas stream, receive a second gas stream, wherein the second gas stream comprises hydrogen sulfide ($H_2S$), and receive a third gas stream, wherein the third gas stream comprises oxygen ($O_2$), wherein the amount of the third gas stream provided to the SRU is adjusted to maintain a reaction between $SO_2$ and $H_2S$ in the STP. According to some embodiments, the sulfur-bearing waste comprises spent HDP catalyst. According to some embodiments, the STP comprises a Claus process. According to some embodiments, the STP comprises a thermal reactor and wherein the first, second, and third gas streams are received at the thermal reactor. According to some embodiments, the at least one catalyst recovery unit comprises a reactor configured to heat the spent HDP catalyst at a temperature of about 500° F. to about 850° F. According to some embodiments, the at least one catalyst recovery unit comprises a reactor configured to heat the spent HDP catalyst at a first temperature of about 500° F. to about 700° F. to strip the contaminants from the catalyst and then to heat the spent HDP catalyst at a second temperature of about 750° F. to about 850° F. in an oxygen-containing atmosphere to remove coke on the spent HDP catalyst and to convert metal sulfides of the spent HDP catalyst to their oxides. According to some embodiments, the at least one catalyst recovery unit comprises a reactor configured to heat the spent HDP catalyst at a temperature of about 800° F. to about 2000° F. According to some embodiments, the second gas stream comprises one or more streams selected from the groups consisting of an acid gas stream of the retrofitted refinery, an amine gas stream of retrofitted refinery, and a sour water stripping off-gas stream of retrofitted refinery. According to some embodiments, the first gas stream further comprises one or more components selected from the group consisting of carbon dioxide ($CO_2$), water ($H_2O$), and nitrogen ($N_2$) and wherein the retrofitted refinery further comprises an $SO_2$ scrubber configured to treat the first gas stream to provide an $SO_2$-enriched gas stream to the STP. According to some embodiments, treating the first gas stream to provide an $SO_2$-enriched gas stream comprises: contacting the first gas stream with a lean $SO_2$-adsorbing medium to yield an $SO_2$-enriched $SO_2$-adsorbing medium and an $SO_2$-depleted gas, and stripping gaseous $SO_2$-from the $SO_2$-enriched $SO_2$-adsorbing medium to yield the $SO_2$-enriched gas stream. According to some embodiments, the lean $SO_2$-adsorbing medium comprises a solvent comprising an amine. According to some embodiments, adjusting the amount of the third gas stream provided to the STP comprises: determining a feed rate of the at least a portion of the first gas stream to the STP, determining a feed rate of the second gas stream to the STP, and adjusting an amount of the third gas stream provided to the STP based on the determined feed rates. According to some embodiments, adjusting an amount of the third gas stream provided to the STP based on the determined feed rates comprises decreasing the amount of the third gas stream to the STP if the feed rate of the at least a portion of the first gas stream to the STP increases relative to the feed rate of the second gas stream to the STP. According to some embodiments, adjusting the amount of the third gas stream provided to the STP comprises: determining a composition of a tail gas of the STP, and adjusting the amount of the third gas stream provided to the STP based on the determined composition. According to some embodiments, determining the composition of a tail gas of the STP comprises determining a ratio of $H_2S$ to $SO_2$ in the tail gas. According to some embodiments, adjusting the amount of the third gas stream provided to the STP based on the determined composition comprises increasing the amount of the third gas stream provided to the STP if the ratio of $H_2S$ to $SO_2$ increases. According to some embodiments, the retrofitted refinery further comprises one or more pieces of equipment configured to treat the first gas stream to remove particulates from the first gas stream before the STP receives the first gas stream. According to some embodiments, the one or more pieces of equipment is selected from the group consisting of one or more cyclones and one or more electrostatic precipitators. According to some embodiments, the refinery further comprises one or more pieces of equipment configured to treat the first gas stream to lower the temperature of the first gas stream before the STP receives the first gas stream. According to some embodiments, the one or more pieces of equipment is selected from the group consisting of one or more water quenchers and one or more heat exchanger. Also disclosed herein are methods of retrofitting a refinery, natural gas processing plant, hydrocarbon upgrading plant/process, or the like, by providing/assembling the equipment describe above.

Also disclosed herein is a method of treating a sulfur-bearing waste, the method comprising: heating the sulfur-bearing waste to produce a first gas stream, wherein the first gas stream comprises sulfur dioxide ($SO_2$), providing at least a portion of the first gas stream to a sulfur treating process (STP), and providing a second gas stream to the STP, wherein the second gas stream comprises hydrogen sulfide ($H_2S$). According to some embodiments, the STP comprises a Claus process. According to some embodiments, the method further comprises: providing a third gas stream to the STP, wherein the third gas stream comprises oxygen ($O_2$), and adjusting an amount of the third gas stream provided to the STP to maintain a reaction between $SO_2$ and H$_2$S. According to some embodiments, the STP comprises a sulfuric acid plant. According to some embodiments, the sulfur-bearing waste comprises spent HDP catalyst. According to some embodiments, the sulfur-bearing waste comprises storage tank sludge or sulfur trap catalyst.

DETAILED DESCRIPTION

As mentioned above, HDP catalysts become spent during use and must be removed from the HDP units of the refinery. Handling of the spent catalyst poses several problems. The spent catalyst typically contains catalytic and contaminant metals in the sulfide form as well as liquid hydrocarbons and hydrocarbon deposits (i.e., coke). Such contaminants increase the weight of the catalyst material and, in many cases, may render the spent catalyst hazardous and/or self-heating, which increases the costs of handling and transporting the spent catalyst.

Thermal stripping/oxidation technologies exist that can render the spent catalyst non-self-heating and/or convert it to a hazardous product rather than a waste. However, such oxidation processes convert the sulfur and sulfur-containing compounds present on the spent catalyst into sulfur dioxide (SO$_2$), which must be captured or treated using a sulfur abatement technology. Such sulfur abatement equipment and processing add a significant cost to treating the spent catalyst.

The methods and systems described in this disclosure leverage the sulfur abatement resources that are present at treating facilities such as refineries and gas processing plants to capture and treat sulfur-containing byproducts, such as SO$_2$, that are generated during the regeneration of sulfur-bearing wastes, such as spent HDP catalysts. These sulfur abatement resources at the treating facility, e.g., the Claus sulfur recovery process, recover elemental sulfur as a product that can be used in fertilizer or other valuable products. To date, the removal of sulfur compounds from spent catalyst (by roasting or regeneration in an oxygen containing gas) has not been successfully integrated into the treating facility's Claus sulfur recovery system. The subject disclosure describes how this may be successfully done, thus converting the hazardous waste spent catalyst to a salable product at its source while simultaneously capturing the sulfur oxides removed from the catalyst and converting them to a useful product instead of a resultant waste stream requiring management and/or disposal. Thus, spent HDP catalyst can be roasted or regenerated at the refinery site or other treating facility that incorporates sulfur abatement.

Figure 1:
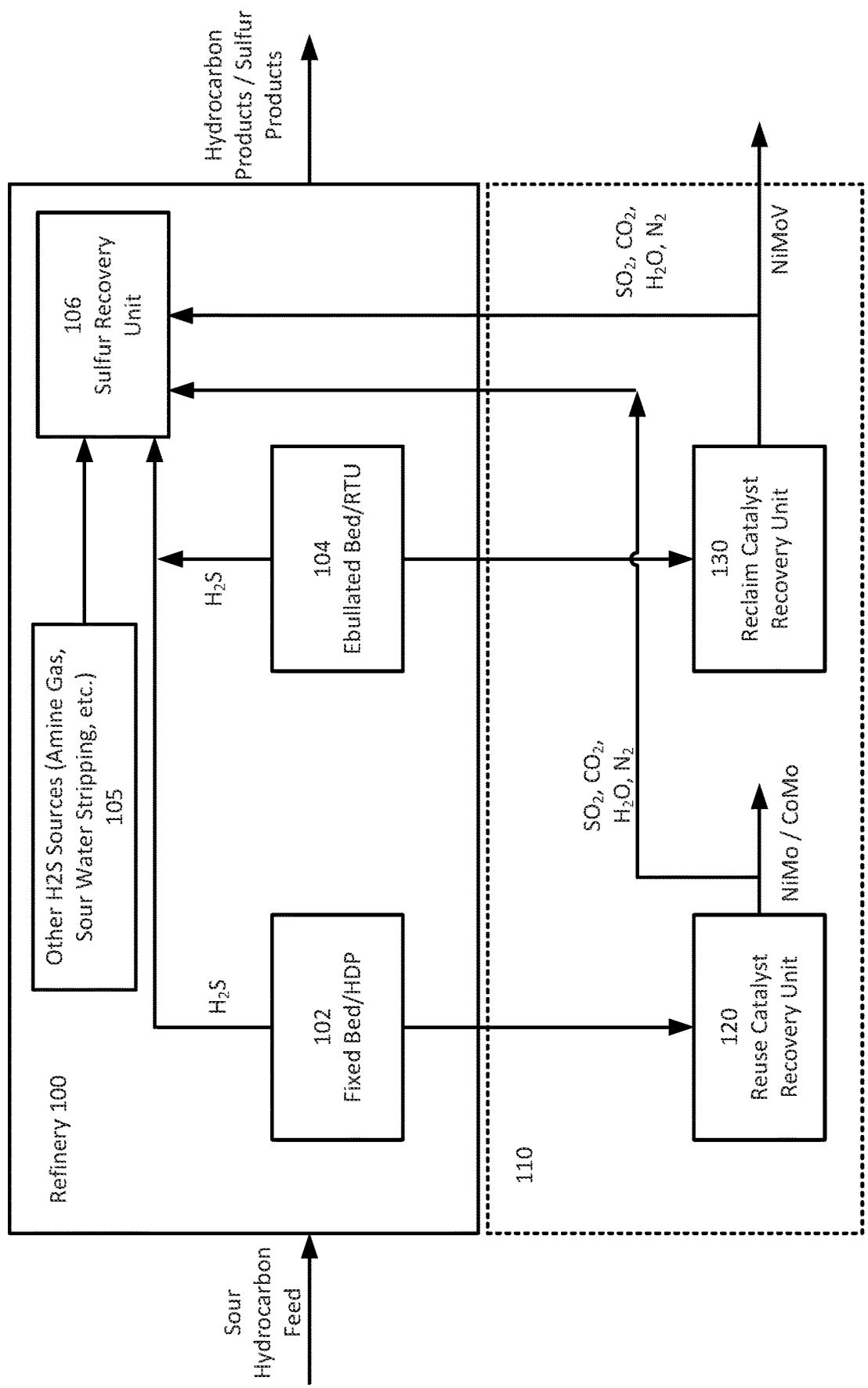
FIG. 1 shows a refinery retrofitted with a HDP catalyst recovery system.

FIG. 1 illustrates a high-level schematic of a hydrocarbon refinery 100, retrofitted with an HDP catalyst recovery system 110, as described herein. It will be appreciated that a hydrocarbon refinery includes many processes and pieces of equipment that are not illustrated in FIG. 1 and that are familiar to a person of skill in the art. But for the purposes of this discussion, two HDP units are illustrated. HDP unit 102 can be a fixed bed hydrotreating unit, such as typically used to treat atmospheric distillation products and light products from the vacuum distillation within the refinery 100. HDP unit 104 can be fixed bed or an ebullated bed unit, such as typically used to treat residue from the vacuum distillation within the refinery. HDP unit 104 may be referred to herein as a resid-treating unit (RTU).

Again, it should be emphasized that HDP units 102 and 104 are only exemplary. A working refinery likely contains many different HDP units and such units may employ a variety of configurations, as is known in the art, such as fixed beds, moving beds, expanded or ebullated beds, and slurry beds. FIG. 1 is intended to illustrate two contexts in which HDP units are employed. Generally, catalysts in both types of HDP units 102 and 104, as well as in any HDP units present in the refinery, will accumulate deposits of hydrocarbon, other carbonaceous materials, sulfur-containing materials, and metal-containing materials during their use. The resid-treating HDP unit 104 catalyst picks up large amounts of metals, such as vanadium as the heavy residual oil is upgraded to lighter weight oil or synthetic crude oil.

Generally, spent catalyst derived from the treatment of atmospheric distillation products and light products (such as in HDP unit 102) may be regenerated/reclaimed for reuse. Contrarily, spent catalyst derived from the treatment of residual oil and other heavy feeds (such as in HDP unit 104) may be too contaminated with metal-containing materials to be reused as catalyst even after such catalysts are treated to remove the accumulate deposits of hydrocarbon, other carbonaceous materials, sulfur-containing materials. Thus, the value in treating such spent catalyst is primarily to reclaim/recycle the component metals. However, it should be noted that these generalities may not always apply. For example, top beds of light feed treatments (i.e., HDP unit 102) may produce spent catalyst that is too poisoned for regeneration/reuse. Likewise, spent catalyst from the treatment of some resids and other heavy products (i.e., HDP unit 104) may still be suitable for regeneration and reuse. The point is that the catalyst treatment/regeneration methods and systems described herein may be used either for catalyst regeneration/reuse and/or for metals reclamation.

Referring again to FIG. 1, the retrofit HDP catalyst recovery system 110 includes two HDP catalyst recovery units 120 and 130. It should be noted that while two HDP catalyst recovery units are illustrated for the purposes of this discussion, the retrofit HDP catalyst recovery system may include more or fewer than two HDP catalyst recovery units.

The HDP catalyst recovery unit 120 is referred to herein as a reuse catalyst recovery unit, because generally, the purpose of the reuse catalyst recovery unit 120 is to treat (i.e., regenerate) a spent HDP catalyst for reuse. The HDP catalyst recovery unit 130 is referred to herein as a reclaim catalyst recovery unit, because generally, the purpose of the reclaim catalyst recovery unit 130 is to render the spent HDP catalyst safe (e.g., non-self-heating) for further reclamation of the catalyst components, such as metals within the catalyst. The illustration is intended to show that the reuse catalyst recovery unit 120 may typically be used to treat catalyst derived from hydrotreating processes that operate on lighter materials whereas the reclaim catalyst recovery unit 130 may typically be used to treat catalyst derived from hydrotreating processes that operate on heavier materials, such as residuum. As mentioned above, embodiments of the disclosed system may include one of or both types of HDP treatment units.

As mentioned above, the purpose of the reuse catalyst recovery unit 120 is to recover and treat spent HDP catalyst that has low levels of contaminants generated by refinery processes such as naphtha hydrotreaters, kerosene or jet hydrotreaters, distillate hydrotreaters, and other reactors, or certain beds in reactors, that have low levels of contaminants when the catalyst is removed from the reactors. According to some embodiments, the reuse catalyst recovery unit 120 can comprise a first stage for stripping free hydrocarbons from the spent catalyst, if any significant levels are present, and a second stage for regeneration of the spent catalyst in an oxygen-containing gas to remove coke on the catalyst and convert the catalyst metal sulfides to their oxide form. The first stage, i.e., stripping free hydrocarbons from the spent catalyst, may comprise thermal desorption of the hydrocarbons from the spent catalyst. Alternatively, or in addition, hydrocarbons may be removed by washing the spent catalyst with an organic solvent or with an aqueous medium that comprises surfactants and/or detergents. Equipment used for the reuse catalyst recovery unit 120 may include a moving belt regenerator, a fluidized bed, a rotolouver, a rotary calciner, or other equipment known in the art. For clarity, auxiliary equipment associated with the reuse catalyst recovery unit 120 has been omitted from FIG. 1. However, such auxiliary equipment will be apparent to a person of skill in the art. For example, the reuse catalyst recovery unit 120 has associated equipment for providing fuel (e.g., natural gas) for operating the unit as well as equipment for providing air to the unit.

According to some embodiments, spent catalyst from the (one or more) HDP unit(s) 102 are transported to the reuse catalyst recovery unit 120. Typically, the spent catalyst may comprise one or more Group VIII (Groups 8-10, IUPAC) metals, such as cobalt (Co) or nickel (Ni) and one or more Group VIB (Group 6, IUPAC) metals, such as molybdenum (Mo) or tungsten (W) supported on a carrier material, such as alumina ($Al_2O_3$), silica alumina, zeolite, or combinations thereof. The spent catalyst may be contaminated with hydrocarbon and carbonaceous contaminants from the HDP process. The spent catalyst may be heated in the reuse catalyst recovery unit 120 to strip those contaminants from the catalyst and to regenerate the spent catalyst. For example, the spent catalyst may be heated within a temperature range of about 500° F. to about 900° F. According to some embodiments, the reuse catalyst recovery unit 120 may employ multiple heating stages. For example, in a first stage the spent catalyst may be heated within a temperature range of about 500° F. to about 700° F. to strip the contaminants from the catalyst. Alternatively (or additionally) the spent catalyst may be washed with organic solvent and/or with an aqueous medium that may contain one or more surfactants and/or detergents. Then a second stage may be employed whereby the stripped catalyst is heated in an oxygen-containing atmosphere at a temperature of about 750° F. to about 900° F. to remove coke on the catalyst and convert the catalyst metal sulfides to their oxide form (i.e., to regenerate the catalyst). The oxygen-containing gas may be air or oxygen-enriched air, for example.

Heating the spent catalyst during the stripping and/or regeneration stages yields an exhaust gas that typically comprises $SO_2$, $CO_2$, $H_2O$, and $N_2$. For example, the exhaust gas may comprise about 65% to about 85% $N_2$, about 10% to about 20% $O_2$, about 0.1% to about 0.4% $CO_2$, and about 0.05% to about 0.2% $SO_2$. As explained in more detail below, the exhaust from the reuse catalyst recovery unit 120 can be provided to the refinery's sulfur recovery unit (SRU) 106.

Referring again to FIG. 1, recall that the purpose of the reclaim catalyst recovery unit 130 is to recover and treat spent HDP catalyst derived from hydrotreating processes that operate on heavier materials, such as hydrocarbon residues, and to render the spent HDP catalyst safe (i.e., non-self-heating) for transport, for example. Generally, the spent catalyst treated in the reclaim catalyst recovery unit 130 are richer in metal contaminants, such as vanadium. There are several thermal oxidation units that can be used for the reclaim catalyst recovery unit 130, including direct-fired kilns, rotolouvers, multiple hearth furnaces, moving belt regenerators, etc. A direct-fired rotary kiln is particularly well suited to roast the catalyst at temperatures in the range of 800° F. to 2000° F. This roasting process removes most of the sulfur and carbon from the catalyst and eliminates any self-heating hazards associated with the catalyst. Roasting the spent catalyst during in the reclaim catalyst recovery unit 130 yields an exhaust gas that typically comprises $SO_2$, $CO_2$, $H_2O$, and $N_2$. For example, the exhaust gas may comprise about 65% to about 85% $N_2$, about 5% to about 30% $O_2$, about 1% to about 20% $CO_2$, and about 0.1% to about 4% $SO_2$. As explained in more detail below, the exhaust from the reclaim catalyst recovery unit 130 can be provided to the refinery's sulfur recovery unit (SRU) 106. For clarity, auxiliary equipment associated with the reclaim catalyst recovery unit 130 has been omitted from FIG. 1. However, such auxiliary equipment will be apparent to a person of skill in the art. For example, the reclaim catalyst recovery unit 130 has associated equipment for providing fuel (e.g., natural gas) for operating the unit as well as equipment for providing air to the unit. According to some embodiments, the reclaim catalyst recovery unit 130 may be self-sustaining once roasting is initiated.

Referring again to FIG. 1, the illustrated refinery 100 also includes sulfur recovery unit (SRU) 106. The main purpose of sulfur recovery facilities of the refinery is pollution control. Crude oils, oil sands and natural gas streams contain sulfur compounds throughout the boiling range from low molecular weight mercaptans to very high molecular weight residuum. The hydroprocessing (HDP) of these compounds, such as in Units 102 and/or 104 of FIG. 1, forms hydrogen sulfide ($H_2S$) gas as a byproduct. Sulfur recovery is a critical part of most refineries because, in most jurisdictions, it is required by law to minimize emissions of sulfur compounds to the environment. Sulfur recovery facilities convert $H_2S$ gas to produce marketable products (e.g., sulfuric acid and/or elemental sulfur).

Figure 2:
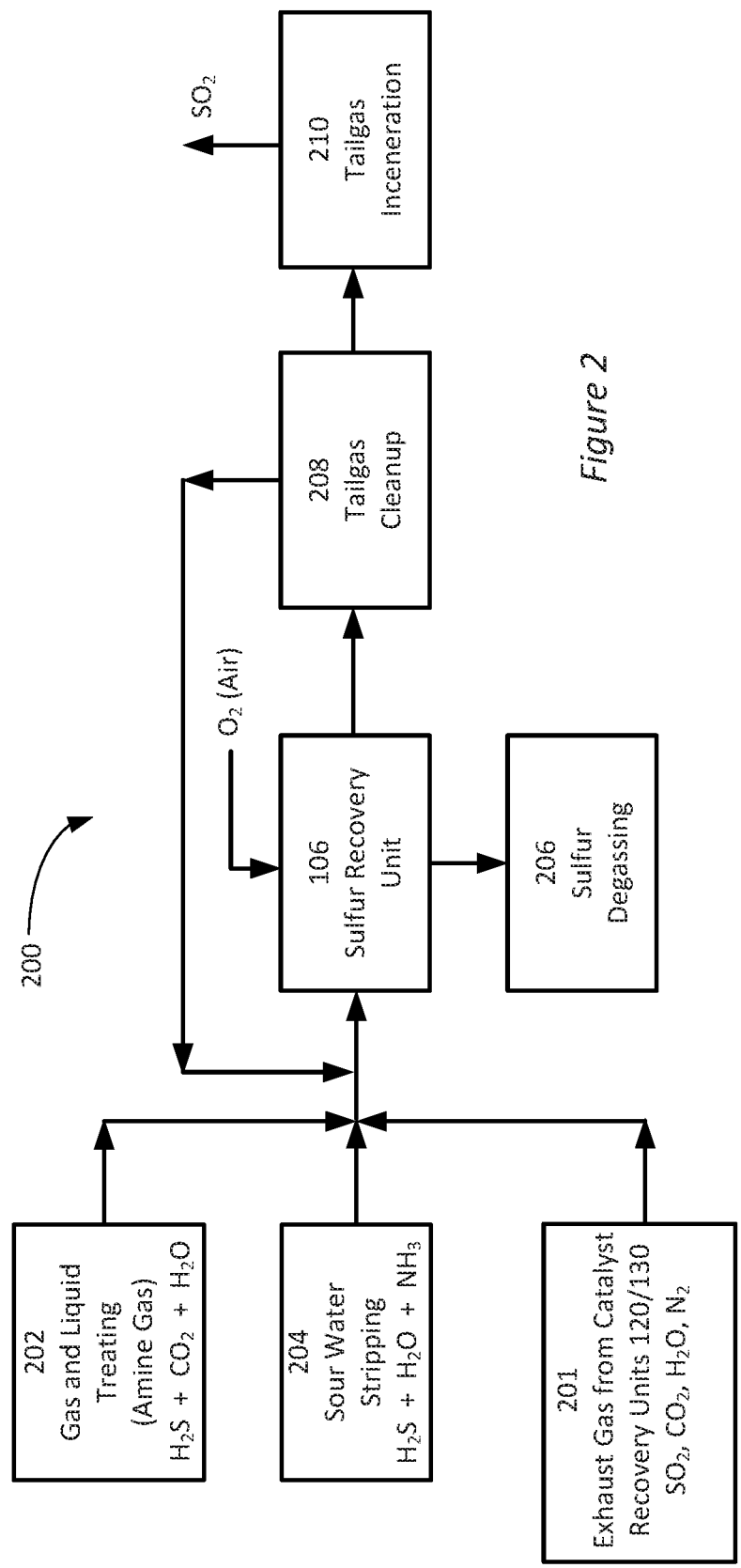
FIG. 2 shows a sulfur recovery facility.

FIG. 2 illustrates a typical processing scheme for a sulfur recovery facility 200, such as used to process feed streams associated with natural gas processing or crude oil refining. The sulfur recovery facility 200 has been retrofitted to accept exhaust gas 201 from the reuse catalyst recovery unit 120 and/or the reclaim catalyst recovery unit 130. Details of the retrofit are explained in more detail below. The sulfur recovery facility 200 includes a sulfur recovery unit 106, as illustrated in FIG. 1 and discussed in more detail below. The primary feed stream to the sulfur recovery unit 106 is the acid gas streams from the gas and/or liquid treating systems 202 of the refinery. When the treating system uses an amine solvent, the feed stream 202 may be referred to as an amine acid gas stream. A typical acid gas stream provided to an SRU of a refinery typically comprises hydrogen sulfide, carbon dioxide, water, and possibly small amounts of hydrocarbon gases. For example, the acid gas stream may comprise about 40% to about 95% $H_2S$, about 1% to about 10% $H_2O$, about 1% to about 40% $CO_2$, and about 1% to about 8% hydrocarbons. Some embodiments of a sulfur recovery unit 106 are also configured to process the off-gas from sour water stripping (SWS) systems 204. Oxygen ($O_2$) is typically supplied to the SRU 106 in the form of air or $O_2$-enriched air. The SRU 106 typically converts and recovers 93-98% of the sulfur contained in the feed streams as elemental sulfur, producing a molten sulfur product, which may be degassed in sulfur degassing unit 206 to reduce/remove the $H_2S$ remaining in the sulfur. The sulfur recovery facility may include a tail gas cleanup unit 208, which converts small amounts of sulfur compounds not converted in the SRU 106 into $H_2S$ and recycles it back to the SRU 106. The effluent gas from the tail gas cleanup unit 208 is incinerated 210, which converts all the remaining sulfur compounds to $SO_2$.

The sulfur recovery unit (SRU) 106 of a typical refinery uses a process, referred to as the Claus Process, to convert hydrogen sulfide from the amine gas stream 202 and/or the sour water stripping stream 204 to elemental sulfur. The process involves a multistage catalytic process whereby hydrogen sulfide is oxidized to elemental sulfur according to the overall reaction:

$$2H_2S + O_2 \rightleftharpoons 2/xS_x + 2H_2O$$

Note that the stoichiometry of the above reaction is exemplary only and may change due to modifications in the particulars of the Claus reactions. Each catalytic stage of the sulfur recovery unit 106 typically includes a gas reheater, a catalyst reactor, and a sulfur condenser.

The Claus process involves using a thermal reactor, such as a furnace, to oxidize a portion, for example one-third, of the $H_2S$ in an oxygen-containing atmosphere to form $SO_2$, according to the following reaction:

$$2H_2S + 3O_2 \rightleftharpoons 2SO_2 + 2H_2O$$

The combustion gases, which comprise primarily $H_2S$, $SO_2$, $H_2O$, and $N_2$ are sent to a condenser whereby elemental sulfur is condensed and separated from the process gases, and the cooled gases exiting the condenser are then sent to the catalytic converters. In each stage, the remaining uncombusted portion of the $H_2S$ reacts with $SO_2$ in the catalytic converters to form elemental sulfur, as follows:

$$2H_2S + SO_2 \rightleftharpoons 3/xS_x + 2H_2O$$

Figure 3:
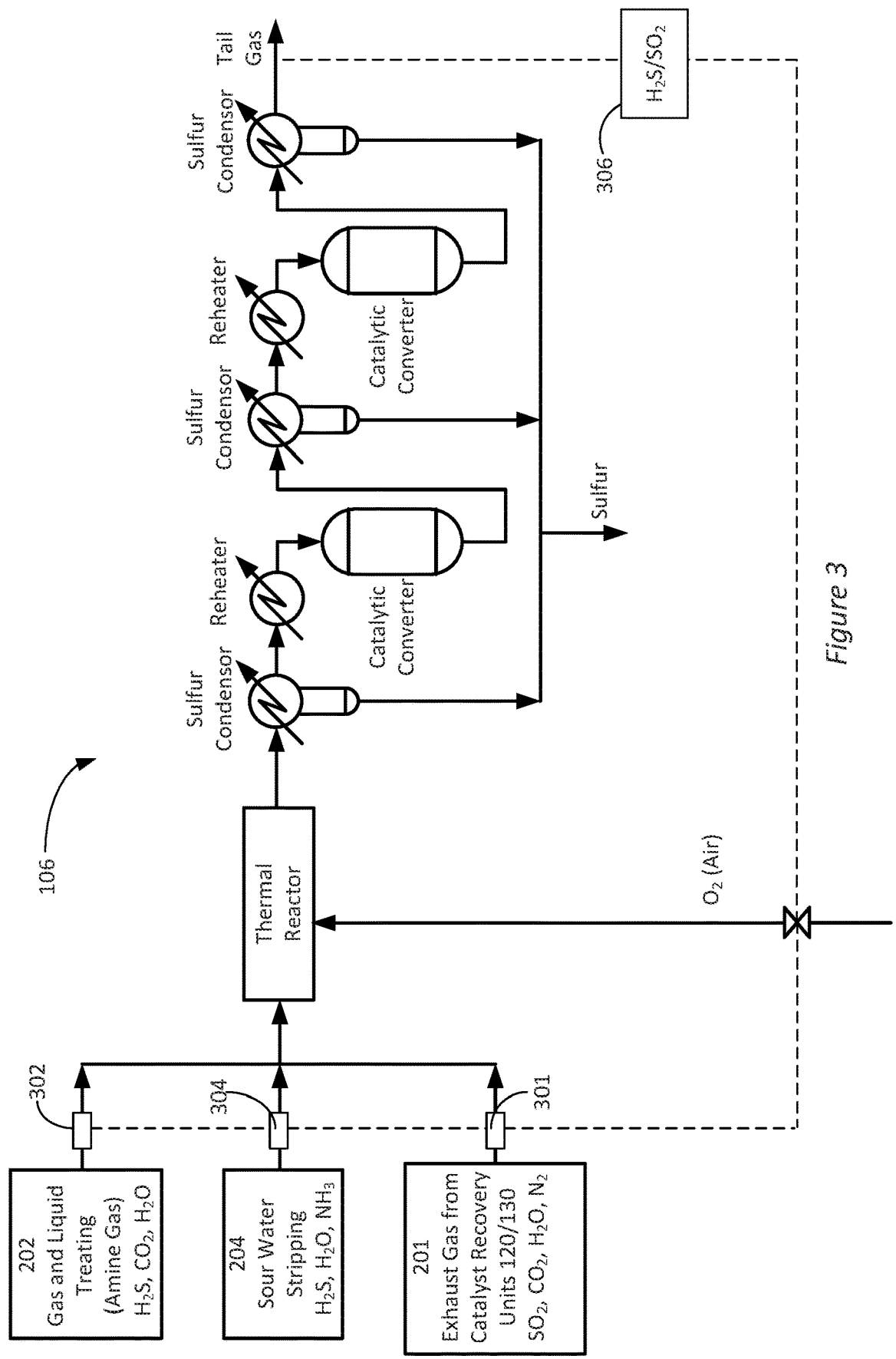
FIG. 3 shows a schematic of a Claus sulfur recovery unit.

Claus Process-based sulfur recovery units are well known in the art and need not be described here in detail. But what is important to note is that sulfur dioxide ($SO_2$) is a reactant in the Claus Process chemistry. Under typical Claus operation, the $SO_2$ is produced via the oxidation of $H_2S$ in the thermal reactor. Embodiments of the disclosed methods introduce $SO_2$-containing gas streams that are the exhaust combustion gas streams from the catalyst recovery units 120 and/or 130 into the Claus SRU, as illustrated in FIG. 3, which illustrates a retrofitted SRU 106. It should be noted that if additional SRU capability is warranted for handling the $SO_2$ generated from catalyst recovery, such additional SRU capability can also be used to offload existing SRU workload, which may increase the overall capacity of the refinery. Refinery rates are sometimes limited by the existing SRU capacity; thus, adding additional SRU capacity may serve the dual purposes of (1) treating $SO_2$ generated by catalyst recovery, and (2) debottlenecking the plant by providing additional SRU capacity for other refinery sulfur-generating processes.

The SRU 106 illustrated in FIG. 3 comprises a thermal reactor (such as a furnace) and two catalytic converters. Upstream of each catalytic converter is a sulfur condenser and a reheater. A final sulfur condenser is provided downstream of the second catalytic converter. It will be appreciated that the SRU 106 may include more or fewer catalytic sections than reflected in FIG. 3. One or more exhaust gas streams 201 from the catalyst recovery units 120 and/or 130 are introduced into the SRU along with the amine gas stream(s) 202 and/or the off-gas stream(s) from the sour water stripping units of the refinery. In the illustrated embodiment, each of the streams 201, 202, and 204 are introduced into the thermal reactor of the SRU. However, other embodiments are contemplated. For example, the catalyst recovery exhaust stream 201 may be introduced to the air stream or may be added downstream from the thermal reactor, for example, into one of the reheaters or catalytic converters.

As some amount of $SO_2$ is introduced into the SRU 106 via stream(s) 201, the operation of the thermal reactor can be adjusted to compensate for that additional $SO_2$. In other words, the thermal reactor of the retrofitted SRU is not responsible for generating all of the $SO_2$ for the Claus chemistry as some of the $SO_2$ is provided from the catalyst recovery unit exhaust stream(s) 201. The thermal reactor conditions are compensated by adjusting the $O_2$ (air) flow to the thermal reactor. The illustrated SRU 106 includes meters 301, 302, and 304 that measure the flow and/or compositions of streams 201, 202, and 204 respectively. Readings from those meters can be used to adjust the amount $O_2$ provided to the thermal reactor based on the flow and/or composition of the streams 201, 202, and 204. For example, the amount of $O_2$ provided to the thermal reactor can be decreased if a greater amount of $SO_2$ is being provided to the thermal reactor, thereby decreasing the amount of $SO_2$ that is generated by oxidizing $H_2S$. Likewise, the SRU 106 may include one or more analyzers 306, for example to analyze the composition of the tail gas and to adjust the amount of $O_2$ provided to the thermal reactor accordingly. For example, the analyzer 306 may determine the relative amounts of $H_2S$ and $SO_2$ in the tail gas. If the amount of $H_2S$ is too high, then more $O_2$ may be provided to the thermal reactor.

The above discussion and FIGS. 1-3 describe how exhaust gas from one or more reuse catalyst recovery unit(s) 120 and/or one or more reclaim catalyst recovery unit(s) 130 can be provided to an SRU 106 of a refinery to treat the $SO_2$ present in the exhaust gases. According to some embodiments, the exhaust gases may be treated such that the exhaust gases are rendered compatible with the SRU 106. For example, the exhaust gases from the catalyst recovery units 120/130 may include particulates, such as catalyst dust, which need to be removed before the gases are piped to the SRU 106. Thus, embodiments of the disclosed retrofit HDP catalyst recovery system 110 and associated methods include one or more processes and associated equipment for treating the exhaust gases before piping them to the SRU 106. For example, particles can be removed from the exhaust gases using techniques and equipment such as one or more cyclones or electrostatic precipitator technology (ESP), such as wet or dry ESP.

Likewise, according to some embodiments, the exhaust gases from the catalyst recovery units 120/130 may be at elevated temperatures and therefore may need to be cooled before being provided to the SRU 106. For example, the reclaim catalyst recovery unit 130 typically operates at temperatures of 1000° F. to about 2000° F., for example 1800° F., as described above. Consequently, the exhaust gas exiting the reclaim catalyst recovery unit 130 may have a temperature of about 1800° F. According to some embodiments, the effluent gases are compressed before they are provided to the SRU. If the gases are to be compressed, they should be cooled, for example, to a temperature below about 400° F. Thus, embodiments of the disclosed retrofit HDP catalyst recovery system 110 and associated methods include one or more processes and associated equipment for cooling the exhaust gases. According to some embodiments, the exhaust gas may be cooled using a water quench, a heat exchanger, or the like. Such treatment of the exhaust streams of the catalyst recovery units 120/130 will be implementation specific and within the ability of a person of skill in the art.

Figure 4:
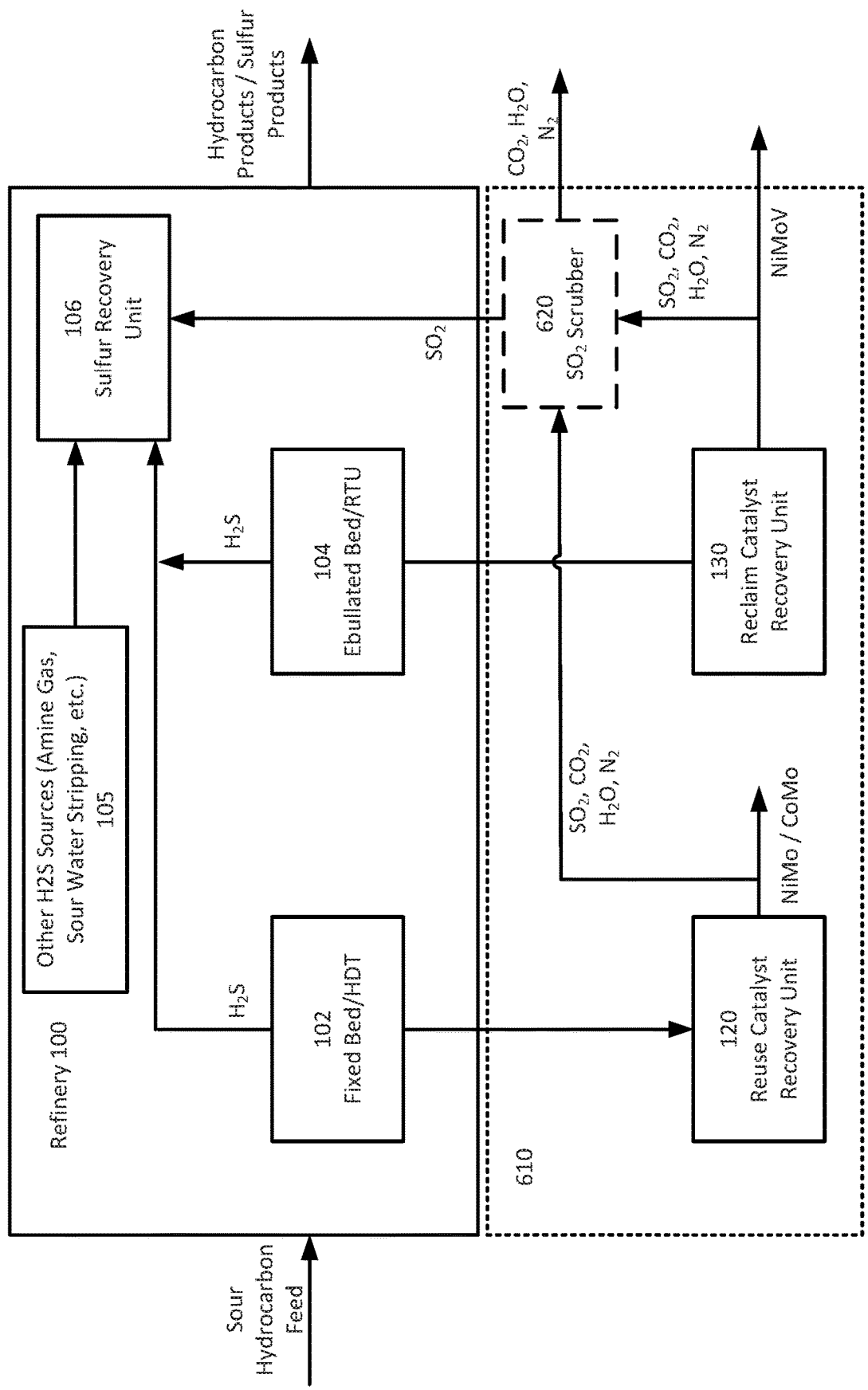
FIG. 4 shows refinery retrofitted with an alternative embodiment of a HDP catalyst recovery system.

FIG. 4 shows a refinery 100 retrofitted with an alternative embodiment of a HDP catalyst recovery system 610. The HDP catalyst recovery system 610 is similar to the embodiment 110 discussed above but includes a sulfur dioxide scrubbing system 620 for separating a portion of the non-$SO_2$ components, such as $CO_2$, $H_2O$, and/or $N_2$ from the combustion gases from the exhaust gases from the reuse bed catalyst recovery unit 120 and/or the reclaim catalyst recovery unit 130. Thus, the sulfur dioxide scrubbing system 620 provides a gas stream to the SRU which is enriched in $SO_2$. It should be noted, that while the sulfur dioxide scrubbing system 620 is illustrated as being included as part of the retrofit catalyst recovery system 610, many refineries include one or more sulfur dioxide scrubbing systems. In such cases, the sulfur dioxide scrubbing equipment of the refinery may be used.

Examples of sulfur dioxide scrubbing systems are well known in the art and need not be described here in detail. Exemplary sulfur dioxide scrubbing systems provide for contacting the $SO_2$-containing feed (i.e., the exhaust gases) with an $SO_2$-adsorbing medium, such as an amine-containing solvent, for example. According to some embodiments, the exhaust gases are contacted with the $SO_2$-absorbing medium, for example, in a counter-current absorption column. $SO_2$ is preferentially absorbed in the $SO_2$-absorbing medium to yield an $SO_2$-enriched absorbing medium and a $SO_2$-depeleted gaseous phase, which is enriched in the non-$SO_2$ components (e.g., $CO_2$, $H_2O$, and/or $N_2$). The $SO_2$ is then stripped from the $SO_2$-enriched absorbing medium to regenerate lean $SO_2$-absorbing medium and to yield a gas stream that is enriched in $SO_2$, which can be provided to the SRU. An example of an $SO_2$ scrubbing system is described in U.S. Pat. No. 7,214,358, issued May 8, 2007.

It should be noted that some refineries may not use a Claus-based process for sulfur recovery, and instead may treat the acid gas streams using other technology such as a sulfuric acid plant. According to some such processes, the $H_2S$ of the acid gas is incinerated to make $SO_2$, which can then be catalytically converted to $SO_3$ and used to produce sulfuric acid. Such sulfur-treating processes of the refinery can also be leveraged to treat the $SO_2$-containing combustion gases from the reuse catalyst recovery unit 120 and/or the reclaim catalyst recovery unit 130, as described above. For example, the combustion gases may be fed to the incinerator and/or to the catalytic converter of a sulfuric acid plant. As used in this disclosure, the term "sulfur recovery unit (SRU)" refers to sulfur abatement technologies based on Claus processes, as well as sulfur abatement technologies based on other processes, such as sulfuric acid plants. Sulfur abatement process, such as, but not limited to, Claus processes, sulfuric acid plants, and the like, are also referred to herein as sulfur treatment processes (STPs).

A person of skill in the art will appreciate that methods and systems of treating sulfur-bearing wastes have been disclosed herein. The disclosure focuses primarily on treating sulfur-bearing spent catalysts used in hydrotreating process. However, the methods and systems described herein can be applied to other sulfur-bearing wastes in a refinery setting. For example, the catalyst recovery units 120 and/or 130 can be used for combusting organics on other wastes such as storage tank sludges and sulfur traps (typically containing Ni and Zn-based catalysts). Thus, while units 120 and 130 are referred to herein as "catalyst recovery units," it should be appreciated that their use is not so limited. In other words, units 120 and 130 may be used to treat any sulfur-bearing waste derived within a hydrocarbon processing plant, a hydrocarbon upgrading process, a natural gas plant, or the like, and to leverage the sulfur-treatment equipment of such processing plants to abate the generated $SO_2$. Thus, throughout this specification, the term "catalyst recovery unit" may be substituted with terms such as "sulfur waste treating unit," "sulfur waste heating unit," "sulfur waste oxidation unit," or the like. Depending on the nature and composition of the sulfur-bearing waste, the waste may be treated before providing it to the treatment unit(s) 120 and/or 130. For example, tank bottoms (or sludge) may comprise solids and oil. Such waste may be treated to separate the oil from the solids so that the oil can be sold or reprocessed, and the solids can be treated using the treatment unit(s) 120 and/or 130. For example, the waste may be treated using one or more mechanical methods, such as centrifugation to separate solid and liquid components of the waste.

The above discussion primarily focuses on embodiments wherein catalyst recovery systems are implemented in a refinery setting and particularly wherein such systems leverage the refinery's sulfur-treatment equipment to abate the $SO_2$ produced during catalyst recovery. However other embodiments can be implemented in settings other than refineries that include sulfur-treatment. For example, natural gas processing plants typically include Claus and/or other sulfur abatement facilities and such facilities can be leveraged to treat $SO_2$ produced during catalyst recovery, as described above. For example, spent catalyst from processes such as oil sands/bitumen upgrading may be regenerated at a natural gas processing plant and the plant's sulfur-treatment facilities used to treat the produced $SO_2$.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges may appear in one or more claims below. All numerical values are "about" or "approximately" the indicated value, and take into account numerical error and variations that would be expected by a person having ordinary skill in the art. Unless otherwise noted, "about" may be interpreted to imply plus or minus 10 percent. The use of the word "a" or "an" when used in conjunction with the term "comprising" in the claims or the specification means one or more than one, unless the context dictates otherwise. The use of the term "or" in the claims is used to mean "and/or" unless explicitly indicated to refer to alternatives only or if the alternatives are mutually exclusive. The terms "comprise", "have", "include" and "contain" (and their variants) are open-ended linking verbs and allow the addition of other elements when used in a claim.

While the invention herein disclosed has been described in terms of specific embodiments and applications thereof, numerous modifications and variations could be made thereto by those skilled in the art without departing from the scope of the invention set forth in the claims.

What is claimed is:

1. A method of treating a sulfur-bearing waste, the method comprising:
   heating the sulfur-bearing waste to produce a first gas stream, wherein the first gas stream comprises sulfur dioxide ($SO_2$),
   providing at least a portion of the first gas stream to a sulfur treatment process (STP), providing a second gas stream to the STP, wherein the second gas stream comprises hydrogen sulfide ($H_2S$), providing a third gas stream to the STP, wherein the third gas stream comprises oxygen ($O_2$), and adjusting an amount of the third gas stream provided to the STP to maintain a reaction between $SO_2$ and $H_2S$.

2. The method of claim 1, wherein the STP is an STP of a hydrocarbon processing plant.

3. The method of claim 2, wherein the hydrocarbon processing plant is a hydrocarbon refining plant, a hydrocarbon upgrader, or a natural gas treatment plant.

4. The method of claim 2, wherein the second gas stream comprises one or more gas streams derived from a hydrocarbon processing operation of the hydrocarbon processing plant.

5. The method of claim 4, wherein the second gas stream is selected from the group consisting of an acid gas stream, an amine gas stream, and a sour water stripping off-gas stream.

6. The method of claim 3, wherein the hydrocarbon processing plant is a hydrocarbon refining plant and wherein the sulfur-bearing waste comprises spent hydroprocessing (HDP) catalyst derived from the hydrocarbon refining plant.

7. The method of claim 4, wherein the sulfur-bearing waste comprises tank sludge.

8. The method of claim 4, wherein the sulfur-bearing waste comprises sulfur trap catalyst.

9. The method of claim 4, further comprising separating the sulfur-bearing waste from a mixture of oil and the sulfur-bearing waste before heating the sulfur-bearing waste.

10. The method of claim 1, wherein the first gas stream further comprises one or more components selected from the group consisting of carbon dioxide ($CO_2$), water ($H_2O$), and nitrogen ($N_2$) and wherein providing a portion of the first gas stream to the STP comprises treating the first gas stream to provide an $SO_2$-enriched gas stream and providing the $SO_2$-enriched gas stream to the STP.

11. The method of claim 10, wherein treating the first gas stream to provide an $SO_2$-enriched gas stream comprises:

contacting the first gas stream with a lean $SO_2$-adsorbing medium to yield an $SO_2$-enriched $SO_2$-adsorbing medium and an $SO_2$-depleted gas, and stripping gaseous $SO_2$-from the $SO_2$-enriched $SO_2$-adsorbing medium to yield the $SO_2$-enriched gas stream.

12. The method of claim 11, wherein the lean $SO_2$-adsorbing medium comprises a solvent comprising an amine.

13. The method of claim 1, wherein adjusting the amount of the third gas stream provided to the STP comprises:

determining a feed rate of the at least a portion of the first gas stream to the STP, determining a feed rate of the second gas stream to the STP, and adjusting an amount of the third gas stream provided to the STP based on the determined feed rates.

14. The method of claim 13, wherein adjusting an amount of the third gas stream provided to the STP based on the determined feed rates comprises decreasing the amount of the third gas stream to the STP if the feed rate of the at least a portion of the first gas stream to the STP increases relative to the feed rate of the second gas stream to the STP.

15. The method of claim 1, wherein adjusting the amount of the third gas stream provided to the STP comprises:

determining a composition of a tail gas of the STP, and adjusting the amount of the third gas stream provided to the STP based on the determined composition.

16. The method of claim 15, wherein determining the composition of a tail gas of the STP comprises determining a ratio of $H_2S$ to $SO_2$ in the tail gas.

17. The method of claim 16, wherein adjusting the amount of the third gas stream provided to the STP based on the determined composition comprises increasing the amount of the third gas stream provided to the STP if the ratio of $H_2S$ to $SO_2$ increases.

18. The method of claim 1, wherein providing at least a portion of the first gas stream to the STP comprises treating the first gas stream to remove particulates from the first gas stream.

19. The method of claim 1, wherein the STP comprises a Claus process.

20. The method of claim 1, wherein the STP comprises a sulfuric acid plant.

* * * * *